United States Patent
Eom et al.

(10) Patent No.: US 10,208,690 B2
(45) Date of Patent: Feb. 19, 2019

(54) STARTING CONTROL METHOD FOR A VEHICLE

(71) Applicant: HYUNDAI MOTOR COMPANY, Seoul (KR)

(72) Inventors: Tae-Kwang Eom, Seoul (KR); Hyeok-Jun Kwon, Seoul (KR); Jung-Suk Han, Hwaseong-si (KR); Chang-Hyun Lim, Seoul (KR)

(73) Assignee: Hyundai Motor Company, Seoul (KR)

( * ) Notice: Subject to any disclaimer, the term of this patent is extended or adjusted under 35 U.S.C. 154(b) by 53 days.

(21) Appl. No.: 15/373,179

(22) Filed: Dec. 8, 2016

(65) Prior Publication Data

US 2018/0100461 A1    Apr. 12, 2018

(30) Foreign Application Priority Data

Oct. 7, 2016    (KR) .......................... 10-2016-0129795

(51) Int. Cl.
  *F02D 41/22*    (2006.01)
  *F02D 41/06*    (2006.01)
  *F02D 41/14*    (2006.01)
  *F02D 41/30*    (2006.01)
  (Continued)

(52) U.S. Cl.
  CPC ......... *F02D 41/062* (2013.01); *F02D 41/009* (2013.01); *F02D 41/1454* (2013.01); *F02D 41/222* (2013.01); *F02D 41/3076* (2013.01); *F02N 11/106* (2013.01); *F02D 41/22* (2013.01); *F02D 2041/0092* (2013.01); *F02N 2250/06* (2013.01)

(58) Field of Classification Search
  CPC .... F02D 41/062; F02D 41/1454; F02D 41/22; F02D 41/222; F02D 41/3076; F02D 41/009; F02D 2041/0092; F02N 11/106; F02N 2250/06
  USPC ............. 123/198 D, 491; 701/103–105, 107, 701/110–113
  See application file for complete search history.

(56) References Cited

U.S. PATENT DOCUMENTS 5,604,304 A * 2/1997 Kokubo ................ F02D 41/009
                                                       701/101
5,823,166 A * 10/1998 Entenmann ........... F02D 41/009
                                                       123/406.18
(Continued)

FOREIGN PATENT DOCUMENTS

JP    2011132935 A    7/2011
JP    2011169228      9/2011
(Continued)

*Primary Examiner* — Hai Huynh
(74) *Attorney, Agent, or Firm* — Lempia Summerfield Katz LLC

(57) ABSTRACT

A starting control method for a vehicle having an engine may include determining, by an ECU, whether engine RPM rises when the engine is started, determining whether combustion-related parts are normal, when the engine RPM does not rise over a starter RPM, determining whether a cam position sensor and a crank position sensor are normal, when it is determined that the combustion-related parts are normal, performing control to offset a recognized crank angle by 360 degrees, when it is determined that the cam position sensor and the crank position sensor are normal, and restarting the engine based on the offset crank angle.

7 Claims, 7 Drawing Sheets

(51) Int. Cl.
*F02N 11/10* (2006.01)
*F02D 41/00* (2006.01)

(56) References Cited

U.S. PATENT DOCUMENTS

| | | | | |
|---|---|---|---|---|
| 5,870,986 | A * | 2/1999 | Ichinose | F02D 41/062 123/179.16 |
| 6,457,465 | B2 * | 10/2002 | Lee | F02D 41/009 123/643 |
| 7,425,769 | B2 * | 9/2008 | Roh | F02N 11/006 123/179.3 |
| 9,664,595 | B2 * | 5/2017 | Kim | G01M 15/046 |
| 2002/0171383 | A1 * | 11/2002 | Hisada | B60K 6/383 318/432 |
| 2004/0123587 | A1 * | 7/2004 | Kamiya | F02D 41/0235 60/284 |
| 2013/0025568 | A1 * | 1/2013 | Yokoyama | F01L 1/3442 123/445 |
| 2013/0110382 | A1 * | 5/2013 | Ishikawa | F02N 11/0848 701/112 |
| 2013/0289855 | A1 * | 10/2013 | Kitano | F02N 11/00 701/113 |

FOREIGN PATENT DOCUMENTS

| | | |
|---|---|---|
| JP | 2012159013 A | 8/2012 |
| JP | 2013029052 | 2/2013 |
| KR | 20010032397 | 4/2001 |
| KR | 20030029367 A | 4/2003 |
| KR | 20040009303 | 1/2004 |
| KR | 100749272 B1 | 8/2007 |
| KR | 20150055153 A | 5/2015 |

\* cited by examiner

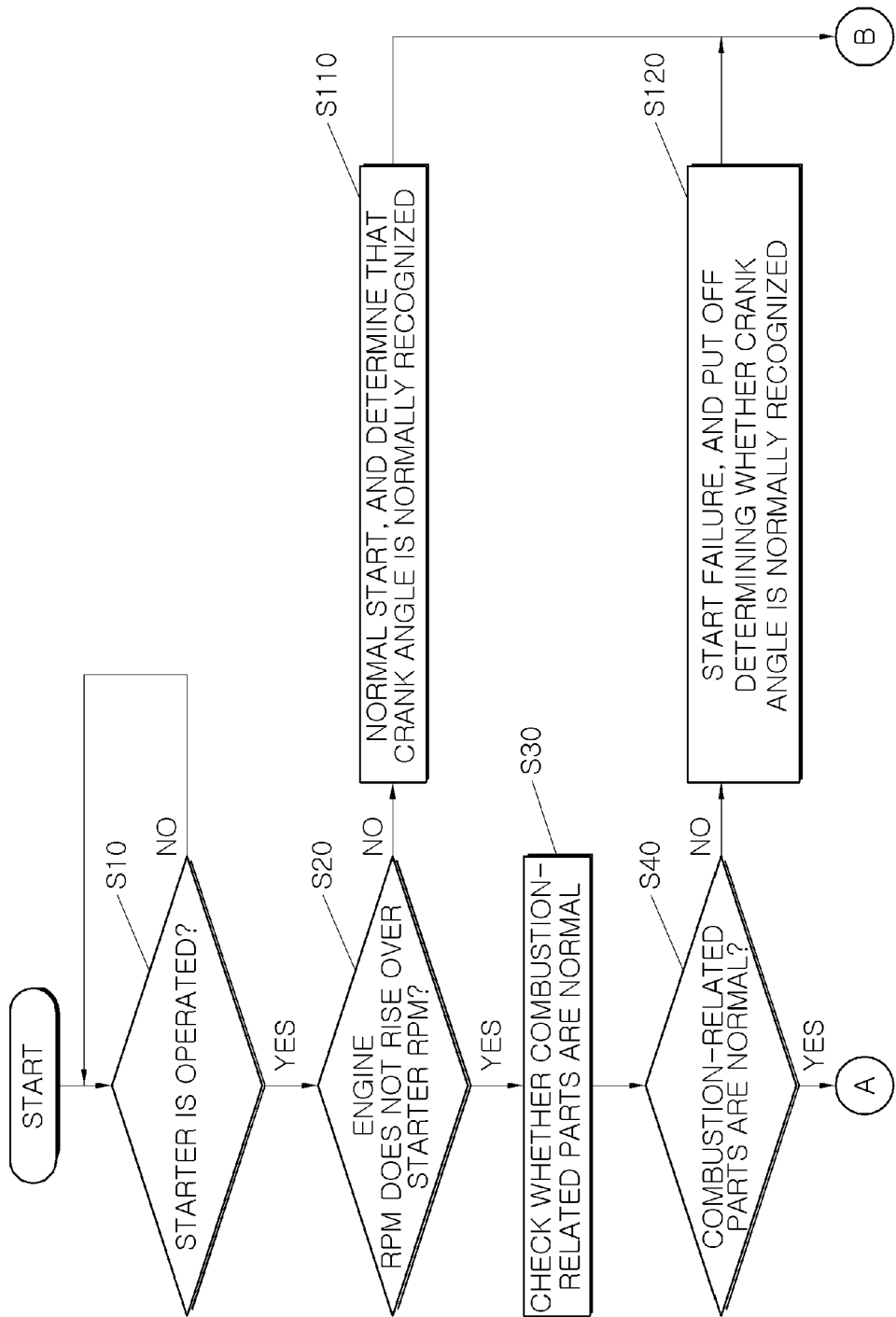

STARTING CONTROL METHOD FOR A VEHICLE

CROSS-REFERENCE(S) TO RELATED APPLICATIONS

This application claims priority to Korean Patent Application No. 10-2016-0129795, filed on Oct. 7, 2016, which is incorporated herein by reference in its entirety.

BACKGROUND

Field of the Disclosure

The present disclosure relates to a starting control method for a vehicle, and more particularly, to a starting control method, which is capable of fixing a starting failure problem of an engine.

Description of Related Art

A vehicle having an internal combustion engine mounted therein is controlled by adjusting a fuel injection point and a fuel ignition point, depending on an operation condition of the engine. In particular, a multi-cylinder engine needs to accurately synchronize the fuel injection points and the fuel ignition points of the respective cylinders to suppress reduced output or generating harmful gas by imperfect combustion.

In order to perform the synchronization of the engine, an accurate rotational position of a crank shaft in each cylinder needs to be detected. Korean Patent Laid-open Publication No. 2003-0029367, published on Apr. 14, 2003, hereinafter KR '367, discloses a technique for detecting an accurate rotational position of a crank shaft. In the technique disclosed by KR '367, a crank position sensor and a cam position sensor are utilized to detect an accurate position of the crank shaft.

When engine control timing deviates from a target timing, an engine will likely not start. Thus, it is necessary to determine an accurate engine control timing from the cam position sensor and the crank position sensor, in order to reliably or safely start the engine.

However, a determination of the engine control timing through the cap position sensor and the crank position sensor is based on the assumption that there is no problem with the reliability of signals from the cap position sensor and the crank position sensor. A crank angle recognized from a cam signal and a crank signal corresponds to an actual physical fastening state of a crank in the cylinder. When an abnormality occurs in the signals from the cam position sensor and the crank position sensor, an ECU (Electronic Control Unit) can easily determine that sensor signal information from the cam position sensor and the crank position sensor does not coincide with the physical fastening state of the crank.

In a conventional control method, when it is determined that the signals from the cam position sensor and the crank position sensor have no abnormality, the ECU determines or considers that the sensor signal information from the cam position sensor and the crank position sensor coincide with the physical fastening state of the crank.

However, even when the ECU determines that the signals from the cam position sensor and the crank position sensor have no abnormality, the sensor signal information from the cam position sensor and the crank position sensor may not coincide with the physical fastening state of the crank.

For example, when the engine is assembled, an exhaust cam and an intake cam may be installed to cross each other. In this case, information on a crank angle, received from a cam signal and a crank signal, does not coincide with an actual crank angle.

An engine that employs a variable valve timing mechanism includes a lock mechanism for locking a valve timing to a specific phase. When an abnormality occurs in the lock mechanism due to the viscosity of oil or an introduction of foreign matter, a cam phase may be fixed. Referring to FIG. 2, when the exhaust cam and the intake cam are normally installed, the exhaust cam and the intake cam are configured to exhibit a cam signal pattern in which an intake cam signal and an exhaust cam signal are L at a crank angle of 0° and are L and H, respectively, at a crank angle of 360°. As illustrated in FIG. 2, however, when the engine is restarted after an engine stall occurred due to the phase fixation of the cam, the sensor signal information from the cam position sensor and the crank position sensor may not coincide with the actual physical fastening state of the crank. In this case, the engine start may fail because the engine control timing does not coincide with the target timing.

However, since the phase fixation of the cam is not a cam signal error, a signal error is not generated. Furthermore, a diagnosis such as a mount check is performed while cam timing control is not performed after the engine is completely started. Therefore, the ECU cannot determine whether the phase of the cam is fixed, regardless of whether the diagnosis deviates from the range of the mount check. During a starting period, an abnormality may be sensed only when a timing error occurs in which pattern matching of the cam signal is completely distorted such as, for example, where an error in which a gap position of the crank signal is attacked. Basically, however, timing control is not performed during the starting period. Thus, although an abnormality is sensed, it is difficult to determine whether the abnormality is caused by the phase fixation of the cam or an error caused by an assembly process.

According to a conventional control method, the ECU determines the crank position of the intake/exhaust cam, based on a combination of L and H of the intake/exhaust cam at a second falling point in a missing tooth of the crank signal. Thus, when the phase of the cam is fixed, the ECU cannot determine whether a crank angle, recognized through the combination of L and H of the intake/exhaust cam after the missing region of the intake/exhaust cam, is correct.

Thus, based on the cam error, the ECU can check whether an abnormality occurs when the engine is completely fired. Therefore, when the start fails, the ECU cannot determine an abnormality of the engine depending on whether the phase of the cam is fixed.

In a conventional control method, although the sensor signal information from the cam position sensor and the crank position sensor does not coincide with the physical fastening state of the crank because it was determined that the signals from the cam position sensor and the crank position sensor had no abnormality, the information of the cam signal and the crank signal may be trusted. As a result, the engine restart fails.

SUMMARY

An embodiment of the present disclosure is directed to a starting control method for a vehicle. The disclosed starting control method is capable of effectively restarting an engine when a start of the engine fails even though a cam signal and a crank signal have no abnormality.

Other objects and advantages of the present disclosure can be understood by the following description, and become apparent with reference to the embodiments of the present disclosure. Also, those skilled in the art to which the present disclosure pertains will understand that the objects and advantages of the present disclosure can be realized by the disclosed starting control method as disclosed herein and as claimed, and combinations thereof.

In accordance with an embodiment of the present disclosure, a starting control method for an engine or a vehicle is provided. The starting control method includes: determining, by an ECU, whether engine RPM rises when the engine is started; determining whether combustion-related parts are normal, when the engine RPM does not rise over a starter RPM; determining whether a cam position sensor and a crank position sensor are normal, when it is determined that the combustion-related parts are normal; performing a control to offset a recognized crank angle by 360 degrees, when it is determined that the cam position sensor and the crank position sensor are normal; and restarting the engine based on the offset crank angle.

The combustion-related parts may include one or more of an injector, an ignition plug and a fuel pump.

When it is determined that the engine RPM rises over the starter RPM after the restart of the engine, the ECU may set the offset crank angle to a current crank angle, and maintain the start based on the set crank angle.

When the engine RPM does not rise over the starter RPM even after the restart of the engine, the ECU may determine whether an air-fuel ratio falls within a normal range. When the air-fuel ratio deviates from the normal range, the ECU may determine that the engine cannot be started.

When the air-fuel ratio falls within the normal range, the ECU may offset the crank angle offset at the previous step by 360 degrees, and restart the engine based on the offset crank angle.

The ECU may count the number of offsets for the crank angle. When the maximum number of offsets is equal to or more than a predetermined value, the ECU may determine that the engine cannot be started.

The engine may include an engine with a variable valve timing mechanism. The starting control method may further include diagnosing a cam error depending on an abnormality of a cam rotation phase lock mechanism of the variable valve timing mechanism, when the start is maintained, and deciding whether to perform limp home logic according to the diagnosis result.

BRIEF DESCRIPTION OF THE DRAWINGS

FIGS. 3A-3C are flowcharts illustrating a control method in accordance with an embodiment of the present disclosure.

DESCRIPTION OF SPECIFIC EMBODIMENTS

Hereafter, exemplary embodiments of the present disclosure will be described below in more detail with reference to the accompanying drawings.

Figure 1:
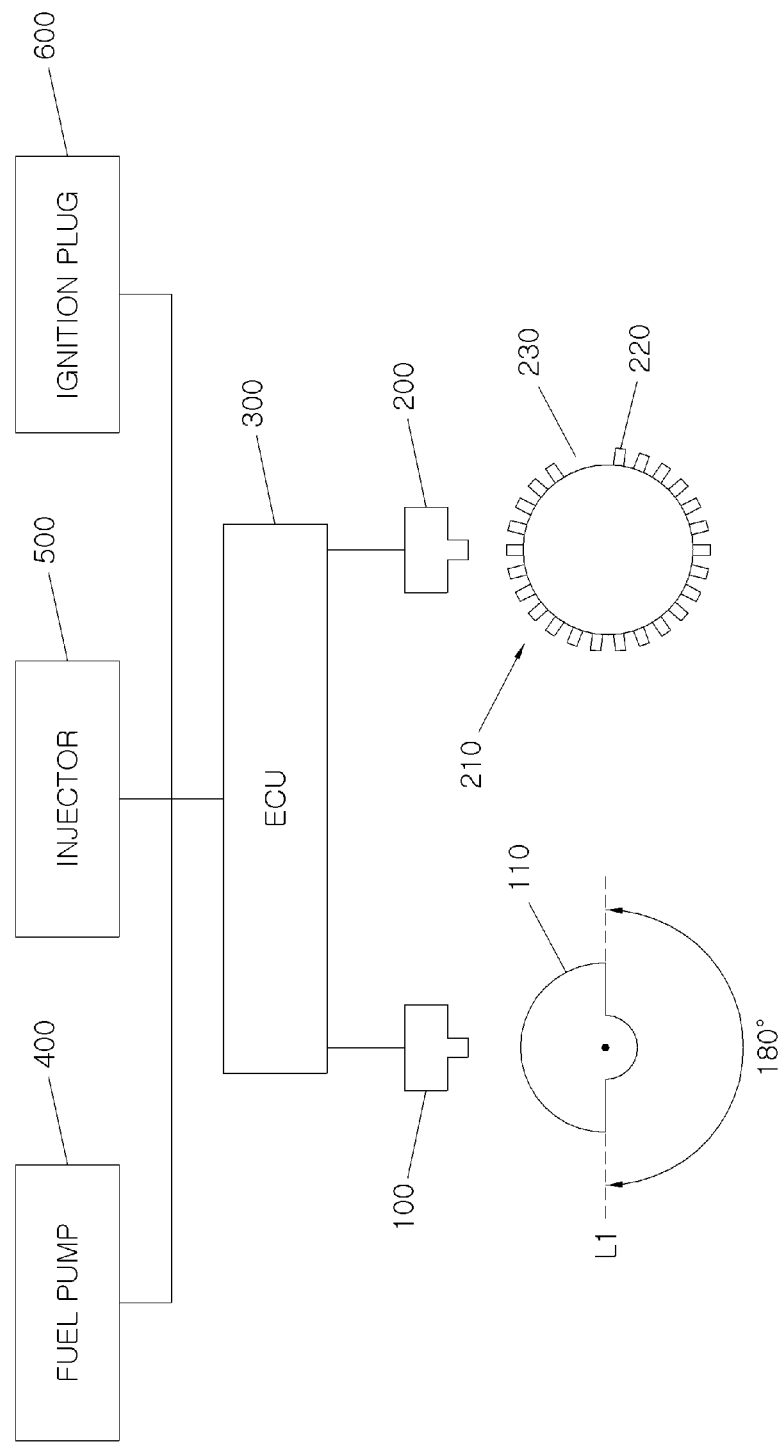
FIG. 1 is a diagram illustrating the configuration of an engine synchronizer to which a control method in accordance with an embodiment of the present disclosure is applied.
Figure 2:
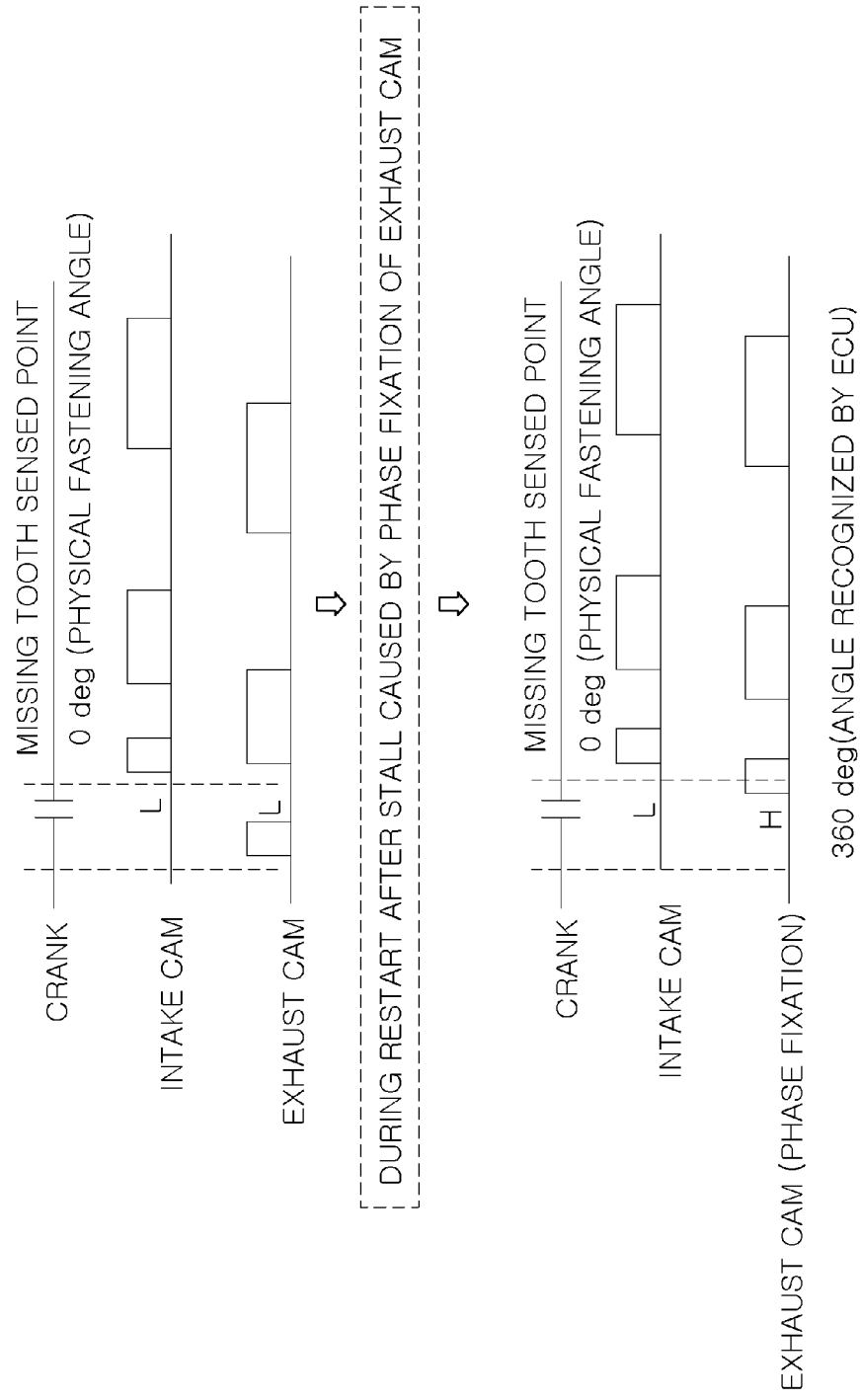
FIG. 2 is a signal diagram illustrating a difference between a crank angle, recognized from a cam signal and a crank signal, and a physical fastening angle of a crank, when a vehicle is restarted after a stall occurs due to phase fixation of an exhaust cam.

FIG. 1 is a diagram illustrating an engine synchronizer to which a control method in accordance with an embodiment of the present disclosure is applied. Referring to FIG. 1, the engine synchronizer to which the control method of the present disclosure is applied includes a cam position sensor 100, a crank position sensor 200 and an electronic control unit (ECU) 300.

The cam position sensor 100 senses a cam edge when a cam shaft of an intake cam or exhaust cam is rotated. The cam position sensor 100 outputs the sensed edge as a pulse-shaped cam signal to the ECU 300. The pulse-shaped cam signal has a voltage phase inverted between a high level H and a low level L. For example, when the output of the cam position sensor 100 has a high level H, it may indicate that a cam 110 is positioned above a line L1 indicated by a dotted line. When the output of the cam position sensor 100 has a low level L, it may indicate that the cam 110 is positioned below the line L1. The cam 110 serves to open and close an intake valve and an exhaust valve, which are installed in a combustion chamber. Further, a cam shaft is rotated in synchronization with a crank shaft.

The crank position sensor 200 is disposed around a sensor wheel 210 that is installed coaxially with the crank shaft. The sensor wheel 210 has a plurality of teeth 220 disposed around the circumference thereof. The crank position sensor 200 senses the teeth to detect the rotation angle and number of the crank shaft, and outputs the detection result as a pulse-shaped crank signal to the ECU 300. In this example, the teeth are not formed around the entire circumference of the sensor wheel 210. That is, no teeth are formed on a part of the circumference of the sensor wheel. The crank position sensor 200 recognizes the part as a missing tooth 230.

The ECU 300 receives a cam signal and a crank signal from the cam position sensor 100 and the crank position sensor 200. The ECU 300 determines a crank position and a cam position using the received result. Furthermore, the ECU 300 controls a fuel pump 400, an injector 500 and an ignition plug 600 using the determined crank position and cam position. The ECU 300 then synchronizes fuel injection timing and ignition timing of the respective cylinders of an engine.

Since the cam 110 is rotated 360 degrees at a constant speed, a signal outputted from the cam position sensor 100 has a time constant that is divided into a low-level time and a high-level time. Furthermore, as described above, the cam shaft is rotated in synchronization with the crank shaft. When the crank shaft is rotated twice, the cam shaft is rotated once. Thus, a missing tooth of the crank signal is sensed at a specific point of time between the low level and the high level of the cam signal.

The ECU 300 may recognize the position of a piston in each cylinder using the signal from the crank position sensor 200. The ECU 300 can determine a crank angle using the signal from the crank position sensor 200 and the signal from the cam position sensor 100. In other words, the ECU 300 may accurately detect at which stroke the piston of each cylinder is positioned.

In the engine synchronizer, the ECU 300 may synchronize the engine using the detected crank angle. As described above, however, when the sensor signal information from the cam position sensor and the crank position sensor does not coincide with the actual physical fastening state of the crank, the ECU recognizes the crank angle as a crank angle which is not suitable for starting. Then, the engine cannot be started.

Hereafter, the control method in accordance with an embodiment of the present disclosure will be described in more detail with reference to FIG. 3A. When information obtained by signals from the cam position sensor 100 and the crank position sensor 200 does not coincide with the physical fastening state of the crank, the control method can detect an accurate crank angle in order to reliably start the engine.

First, the ECU 300 determines whether a starter was operated, at step S10. Based on whether the starter was operated, the ECU 300 may determine whether a starting device was normally operated to normally perform a starting operation.

When determining that the starter was normally operated, the ECU 300 receives information on the RPM of the engine from a drive system, and determines whether the RPM of the engine rises over the RPM of the starter, at step S20. When the RPM of the engine rises over the RPM of the starter, the ECU 300 may determine that the engine was normally completely fired, and determine that a crank angle recognized through a cam signal and a crank signal are normal, at step S110. However, when the RPM of the engine does not rise over the RPM of the starter, the ECU 300 determines that the starting failed.

When determining that the starting failed, the ECU 300 determines whether combustion-related parts are normal. This determination is made in order to determine whether a starting failure was caused by an abnormality in the combustion-related parts, at steps S30 and S40. Preferably, the ECU 300 determines whether one or more of the injector 500, the ignition plug 600 and the fuel pump 400 broke down, through a diagnosis for the parts at step S30. This determination is made in order to determine whether the combustion-related parts are normal, at step S40.

The ECU can recognize whether one or more of the parts broke down, through diagnosis information obtained by an ASIC (Application-Specific IC) installed in the system of the ECU that drives and controls the corresponding parts.

When one or more of the parts broke down, fuel cannot be normally supplied, and injection and ignition in the cylinder cannot be normally performed. Therefore, the ECU 300 determines that the engine cannot be started, and puts off determining whether the crank angle is normal, at step S120.

Figure 3B:
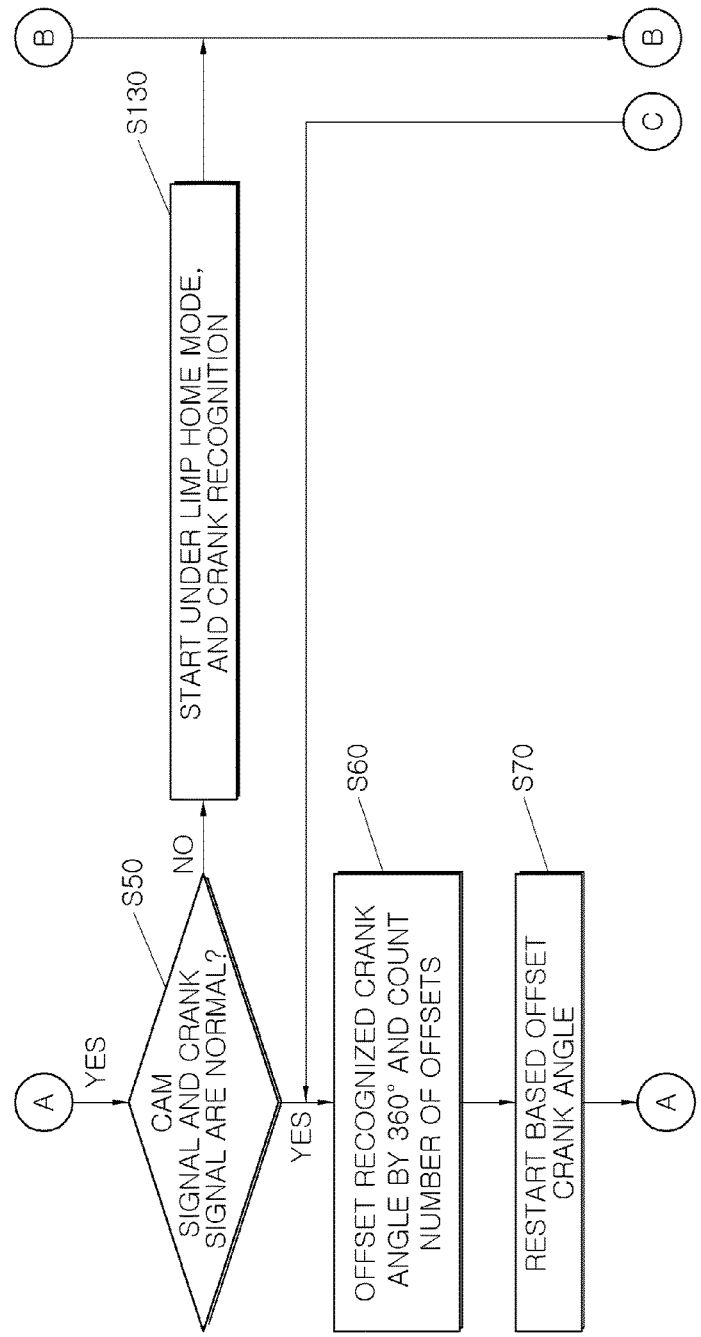

Referring to FIG. 3B, when it is determined that the combustion-related parts have no abnormality, the ECU 300 determines whether the cam signal and the crank signal are normal. This determination is made in order to check the cause of the starting failure, at step S50.

Preferably, the ECU 300 may check whether no signal is received from the cam position sensor 100 or the crank position sensor 200 or whether the waveform of a received signal has an abnormality. This check is made in order to determine whether the cam position sensor 100 and the crank position sensor 200 broke down. Furthermore, when the cam position sensor 100 broke down, it is difficult to accurately decide a crank angle, thereby making it difficult to precisely control engine synchronization. Thus, the ECU 300 switches the driving mode of the engine to a limp home mode to attempt a start, and recognizes a crank angle based on the limp home logic, at step S130.

Figure 4A:
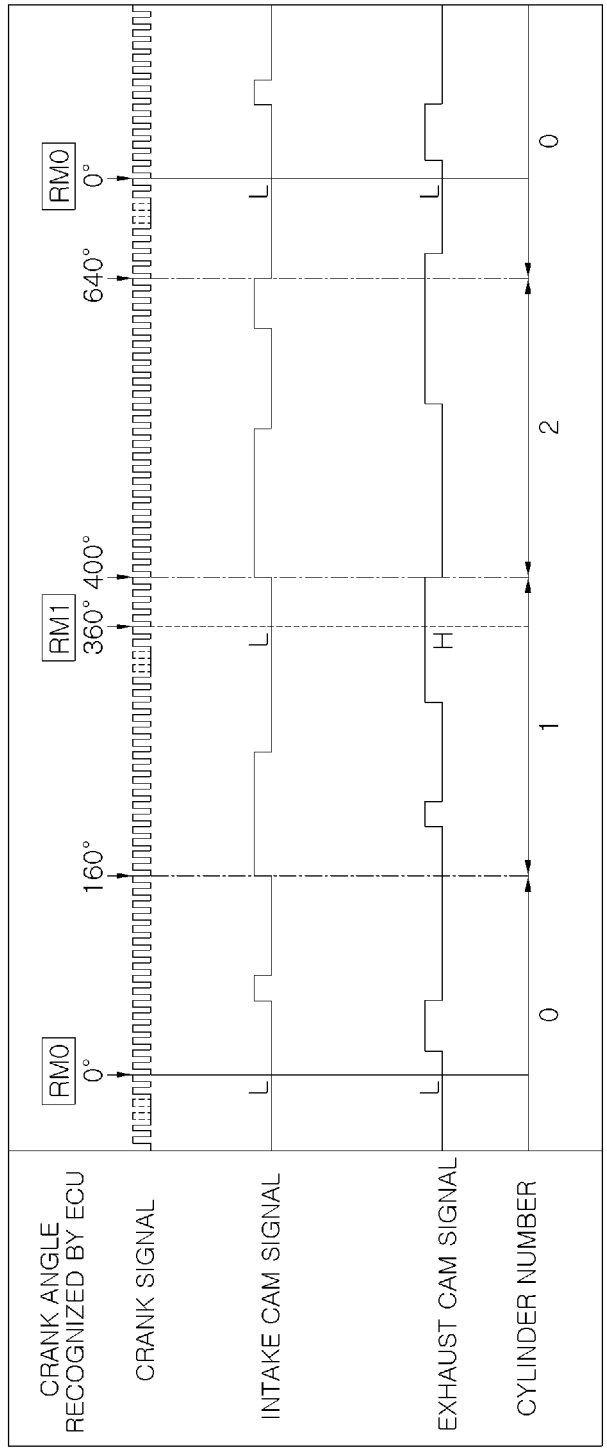
FIG. 4A is a signal diagram when the crank angle, recognized from the cam signal and the crank signal, coincides with the physical fastening angle of the crank, and showing a suitable cylinder number based on the recognized crank angle.
Figure 4B:
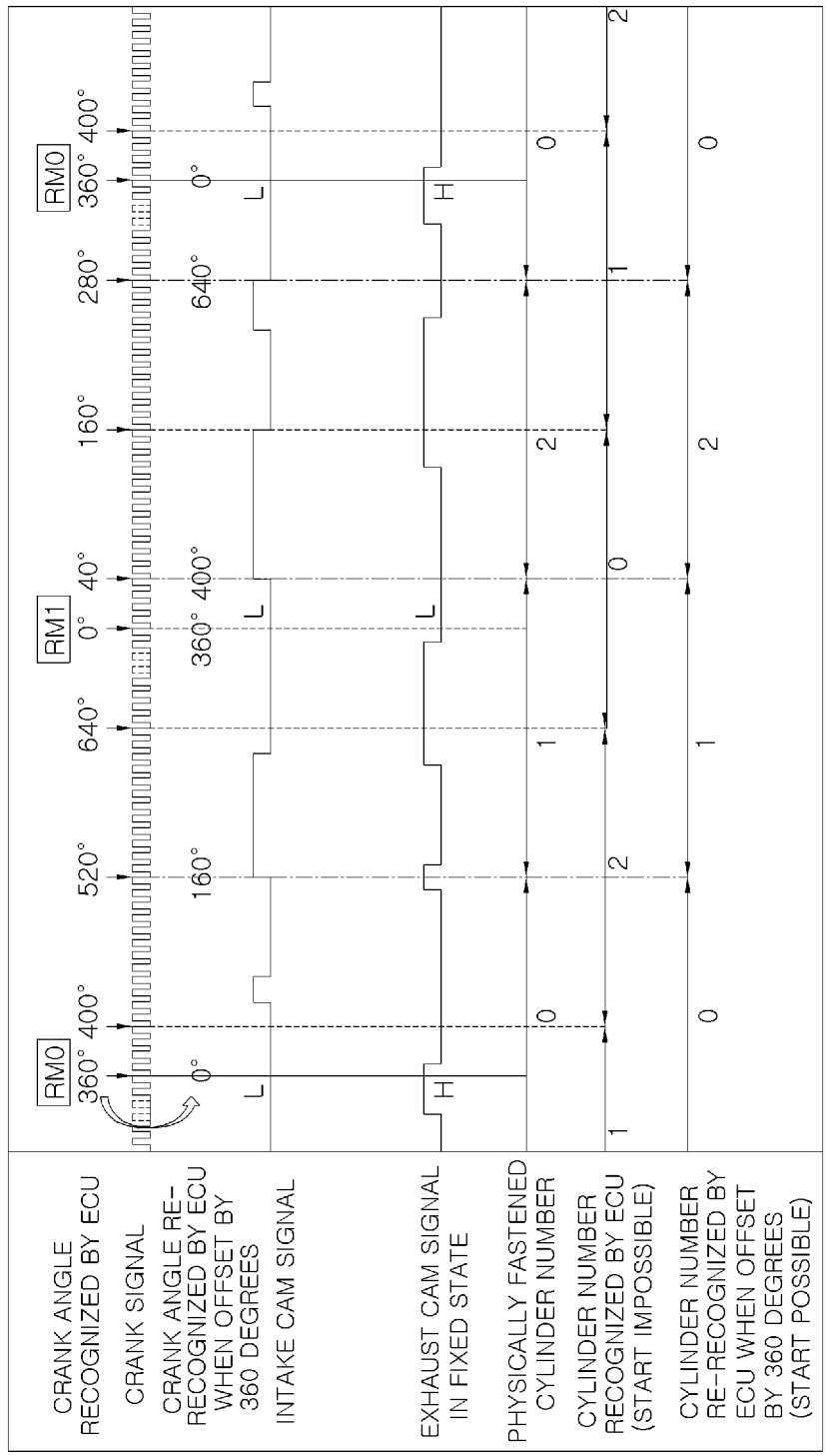
FIG. 4B is a signal diagram obtained by detailing the signal diagram of FIG. 2 when the vehicle is restarted after the phase of the exhaust cam is fixed, showing whether the same suitable cylinder as FIG. 4A is recognized.

When it is determined that the cam signal and the crank signal have no abnormality, the ECU 300 determines that information on the crank angle recognized from the current cam signal and crank signal does not coincide with the physical fastening angle of the crank. In this embodiment, as illustrated in FIGS. 4A and 4B, the crank angle, recognized from the crank signal and the cam signal, deviates by 360 degrees from the actual crank angle. Thus, the ECU 300 offsets the crank angle by 360 degrees, the crank angle being recognized from the signals received from the cam position sensor 100 and the crank position sensor 200, at step S60. Furthermore, the ECU 300 counts the number of offset attempts whenever the crank angle is offset.

Then, the ECU 300 decides which cylinder may be suitable for injection based on the offset crank angle, and restarts the engine based on the decision result, at step S70.

Figure 3C:
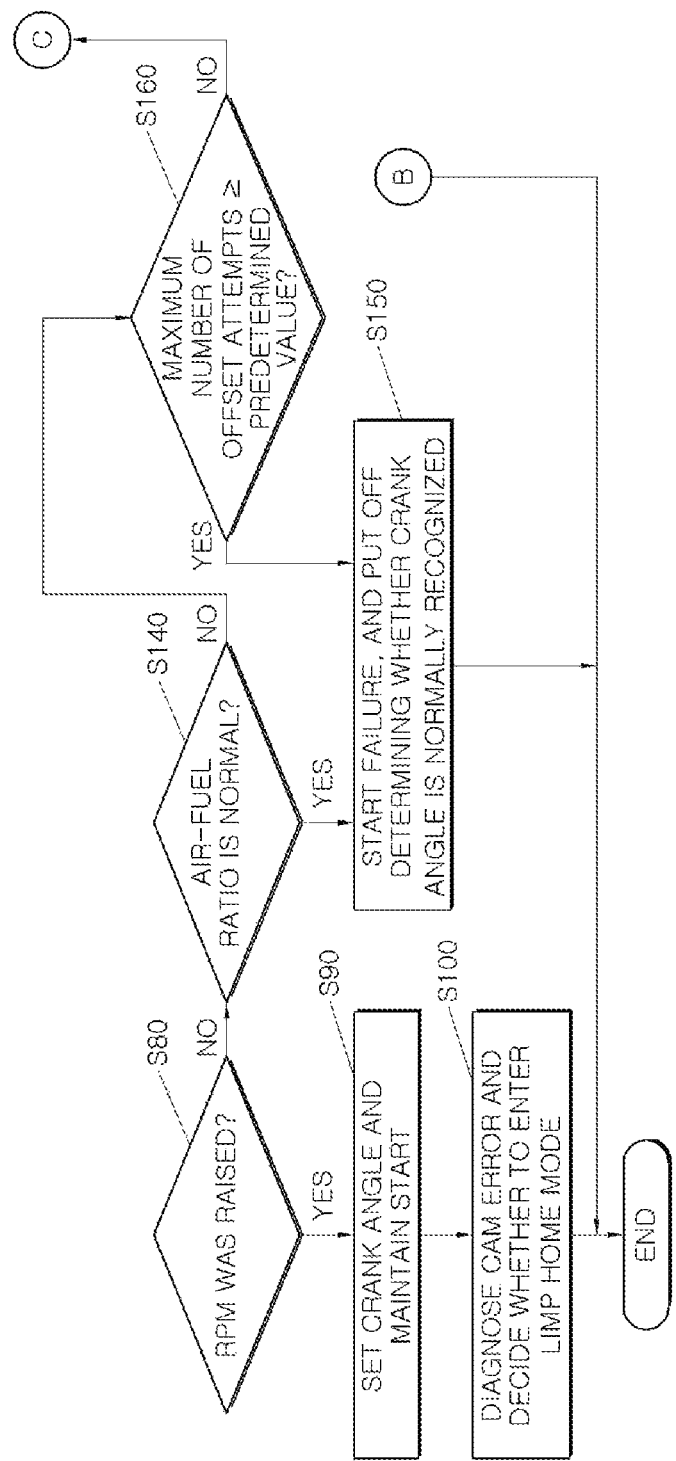

Referring to FIG. 3C, the ECU 300 determines whether the engine RPM was raised by the restart of the engine and the engine was normally completely fired, at step S80. The ECU 300 determines whether the engine is normally started, through an engine roughness determination method for determining a misfire of the engine. The engine roughness indicates a variation in angular speed at each 180° in a four-cylinder engine, and is a characteristic value used for diagnosing a misfire. In other words, when a misfire occurs, the value of the engine roughness significantly rises in a cylinder where the misfire occurs. Thus, when the engine synchronization is abnormally performed, a variation of the engine roughness value is different from that in the normal state. Then, the ECU 300 may determine whether the vehicle is normally started by the increase in RPM of the engine, based on the variation of the engine roughness value.

When it is determined that the engine RPM was raised by the restart of the engine and the start was normally completely fired, the ECU 300 sets the offset crank angle to an actual crank angle. The ECU 300 also determines engine control timing based on the crank angle, thereby maintaining the start, at step S90.

A variable valve timing mechanism may include a lock mechanism capable of fixing the rotational phase of the cam shaft at a specific angle. When a problem occurs in the viscosity of oil or foreign matter is introduced, an abnormality may occur in the operation of the lock mechanism. When the phase fixation of the cam occurs during operation of a vehicle having the variable valve timing mechanism mounted therein, an engine stall may occur. After the stall occurs, the engine control timing deviates from the target timing, and the restart fails.

The ECU 300 may compare a changed angle at a target valve timing in the variable valve timing mechanism to a changed angle at an actual valve timing. This comparison is made in order to determine whether an engine error occurred due to the phase fixation of the cam. That is, the ECU 300 may determine the engine error after the engine is completely fired. When the start of the engine fails, the ECU 300 cannot determine the engine error.

Thus, when the engine is completely fired, the ECU 300 can determine whether to perform a cam error diagnosis. Therefore, through the cam error diagnosis, the ECU 300 may determine whether the starting failure at the previous step is an error caused by the phase fixation of the cam. When it is determined that the starting failure is an error caused by the phase fixation of the cam, the ECU 300 may determine whether to maintain a cam-related control function in the limp home mode, at step S100.

When it is determined that the RPM of the engine is not still raised by the restart of the engine based on the offset crank angle, the ECU 300 determines whether an air-fuel ratio is normal, through a measurement result from a lambda sensor. When it is determined that an abnormality occurred in the air-fuel ratio, the ECU 300 cannot determine and remove the cause of the abnormality, while the engine cannot be normally started. Thus, the ECU 300 determines that the engine cannot be started, and puts off determining whether the crank angle is normally recognized, at step S150.

When the measurement result from the lambda sensor indicates that the air-fuel ratio is normal, the ECU 300 offsets the previously recognized crank angle by 360 degrees at step S60, and attempts to restart the engine based on the additionally offset crank angle at step S70. When it is determined that the maximum number of offset attempts for the crank angle at the current time point is equal to or more than a predetermined value, the ECU 300 neither additionally offsets the crank angle nor attempts to restart the engine. This determination is made in order to protect the engine from damage caused by excessive fuel injection while the restart of the engine is attempted even though the engine cannot be restarted. The ECU 300 determines that the engine cannot be restarted, and puts off determining whether the crank angle is normally recognized, at step S150. The maximum number of offset attempts is reset at the same time as the start of the control method in accordance with the embodiment of the present disclosure, and the number of offset attempts is counted whenever an offset is attempted.

FIGS. 4A and 4B are signal diagrams illustrating whether a suitable cylinder is recognized when the control method in accordance with the embodiment of the present disclosure is performed. FIG. 4A is a signal diagram when a crank angle, recognized from a cam signal and a crank signal, coincides with an actual physical fastening angle of the crank, showing a suitable cylinder number based on the recognized crank angle. FIG. 4B illustrates results obtained by performing the control method in accordance with the embodiment of the present disclosure, when the crank angle, received from the cam signal and the crank signal, does not coincide with the actual physical fastening angle of the crank in the same engine as FIG. 4A, during a restart after the phase of the exhaust cam is fixed.

Compared to FIG. 4A showing the suitable cylinder number, FIG. 4B shows that an error exists in the cylinder number recognition result. Furthermore, when the recognized crank angle is offset by 360 degrees through the control method in accordance with the embodiment of the present disclosure, based on the cam signal and the crank signal, a suitable cylinder number based on the offset crank angle coincides with the result of FIG. 4A. That is, the control method in accordance with the embodiment of the present disclosure can determine a cylinder number suitable for ignition under the circumstances, thereby solving a starting failure problem.

In accordance with the foregoing embodiments of the present disclosure, when a start of the engine fails, even though it is determined that the combustion-related parts and the cam and crank signals have no abnormality, the ECU may offset the recognized crank angle by 360 degrees, thereby reliably or safely restarting the engine.

Even when the sensor signal information from the cam position sensor and the crank position sensor does not coincide with an actual physical fastening state of the crank, the ECU can determine an accurate crank angle, thereby reliably or safely controlling the engine.

When the variable valve timing mechanism is mounted in the vehicle, the engine can be completely fired even though the phase of the cam is fixed. Thus, the ECU can determine whether the engine has an abnormality depending on the phase fixation of the cam, thereby deciding whether to perform the limp home logic.

While the present disclosure has been described with respect to the specific embodiments, it will be apparent to those skilled in the art that various changes and modifications may be made without departing from the spirit and scope of the disclosure as defined in the following claims.

What is claimed is:

1. A starting control method for a vehicle having an engine, the method comprising:
   determining a cam position and a crank position using a cam signal and a crank signal from a cam position sensor and a crank position sensor, by an ECU, when the engine is started;
   determining, by the ECU, whether an engine RPM rises when the engine is started;
   determining whether combustion-related parts are normal, when the engine RPM does not rise over a starter RPM;
   determining whether the cam position sensor and the crank position sensor are normal, when it is determined that the combustion-related parts are normal;
   performing a control to offset a recognized crank angle by 360 degrees, when it is determined that the cam position sensor and the crank position sensor are normal; and
   restarting the engine based on the offset crank angle.

2. The method of claim 1, wherein the combustion-related parts comprise one or more of an injector, an ignition plug and a fuel pump.

3. The method of claim 1, wherein, when it is determined that the engine RPM rises over the starter RPM after the restart of the engine, the ECU sets the offset crank angle to a current crank angle, and maintains the start based on the set offset crank angle.

4. The method of claim 3, wherein the engine includes a variable valve timing mechanism, and wherein the starting control method further comprises a diagnosis of a cam error depending on an abnormality of a cam rotation phase lock mechanism of the variable valve timing mechanism, when the start is maintained, and deciding to perform limp home logic, when it is determined that the cam error depending on the abnormality of a cam rotation phase lock mechanism has occurred, by switching a driving mode of the engine to a limp home mode to attempt a start and recognize a crank angle based on the limp home logic.

5. The method of claim 1, wherein, when the engine RPM does not rise over the starter RPM even after the restart of the engine, the ECU determines whether an air-fuel ratio falls within a normal range, and wherein, when the air-fuel ratio deviates from the normal range, the ECU determines that the engine cannot be started.

6. The method of claim 5, wherein, when the air-fuel ratio falls within the normal range, the ECU offsets the crank angle offset at the previous step by 360 degrees, and restarts the engine based on the offset crank angle.

7. The method of claim 6, wherein the ECU counts the number of offsets for the crank angle, and when the count of the number of offsets is equal to or more than a predetermined value, the ECU determines that the engine cannot be started.

* * * * *